(12) United States Patent  (10) Patent No.: US 6,672,334 B2
Gill  (45) Date of Patent: Jan. 6, 2004

(54) MULTI-DIAPHRAGM VALVE

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 10/430,878

(22) Filed: May 6, 2003

(65) Prior Publication Data

US 2003/0205280 A1 Nov. 6, 2003

Related U.S. Application Data

(60) Provisional application No. 60/380,054, filed on May 6, 2002.

(51) Int. Cl.[7] ............................. F16K 7/00; F16K 31/12
(52) U.S. Cl. ............................. 137/601.03; 137/601.13
(58) Field of Search ...................... 137/601.03, 601.13, 137/599.01; 251/12, 25, 33, 34, 45, 46

(56) References Cited

U.S. PATENT DOCUMENTS 3,727,623 A * 4/1973 Robbins ..................... 137/1
5,671,774 A * 9/1997 Klein et al. ................. 137/486

OTHER PUBLICATIONS

Grove Flexflo catalog sheet, 12" Model 80.
Inbal catalog sheet, Product Description.
Inbal catalog sheet, Typical Application starting with Model 939–01–2.
Inbal catalog sheet, Typical Application starting with Model 939–01.

* cited by examiner

Primary Examiner—Edward K. Look
Assistant Examiner—John K Fristoe, Jr.
(74) Attorney, Agent, or Firm—Mallinckrodt & Mallinckrodt; Robert R. Mallinckrodt

(57) ABSTRACT

A multi-diaphragm flow control valve includes a valve body separable into two parts. Each part includes an interior chamber having a closed end which separates the chambers when the parts are joined and an open end for connection to a pipe. An outer chamber surrounds a portion of the interior chamber and is separated therefrom by an interior wall. Slots connect the interior and outer chambers. The outer chambers connect to form a diaphgram chamber when the parts are joined. A cylindrical bell type elastomeric diaphragm having a central outwardly extending hump and with legs extending axially from opposite sides of the hump is positioned in the diaphragm chamber with the respective legs of the diaphragm over the slots through the interior walls of respective parts. The diaphragm is pressurized to block or allow flow through respective slots and each leg of the diaphragm acts as an independent diaphragm.

19 Claims, 6 Drawing Sheets

SECTION 1-1

MULTI-DIAPHRAGM VALVE

RELATED APPLICATION

This application claims the benefit of provisional application Ser. No. 60/380,054, filed May 6, 2002, and entitled: "Multi-Diaphragm Valve.

BACKGROUND OF INVENTION

1. Field

The invention is in the field of fluid control valves, pressure reducing valves, and pressure relief valves for pipe lines, all operating by means of elastomeric sleeve diaphragms.

2. State of the Art

There are diaphragm sleeve valves currently used to control fluid flow in pipe lines. These valves require the tying or securing of the ends of their sleeve diaphragms. Current sleeve valve designs require the valves to be taken out of the line when replacing their sleeve diaphragms. These valves are designed with slots of very small size, and therefore, can pass only small sized particles in the fluid. The inventor is not aware of any valve using a bell type diaphragm.

The present invention provides a valve which can accommodate larger sizes of debris, and can also accommodate more than one diaphragm in the same valve, which increases the capacity of the valve. Preferably, the ends of the diaphragms are kept free, to keep them from stretching, thus increasing the useful life of the diaphragms; but ends can be tied to the valve body if desired or required.

This invention provides a bell type diaphragm which simultaneously puts the diaphragm in stretch and compression mode, which mitigates the effect of the harmful stretch. It also divides the diaphragm into two sections, where the first section acts as a check valve and the second section acts as a regular valve. Thus, two valves (in the same valve) are provided with one diaphragm. Since each of the said two sections of a diaphragm requires half of the fluid volume usually required by conventional sleeve valves, both sections can be operated with twice the opening and closing speed of conventional sleeve valves. To meet some requirements, the invention provides a faster shut off valve/control valve/check valve combination.

In some applications where the valve's handling of debris is a concern, arcuate platens, made of rigid metal, plastic, or reinforced rubber, are placed inside the diaphragm or around the diaphragm, to cover wider slots than slots commonly used. These slots are made in the cylindrical walls of the inlet and outlet chambers. Thus, this invention provides diaphragms which can accommodate increased slot sizes, thus allowing a valve to accept the passing of debris of very much greater size than is possible with current valves.

The present valve also can function as an air and vacuum valve.

There is demand in the industry for high capacity automatic control valves with less maintenance. Elastomeric diaphragm sleeve valves require less maintenance but their capacity as shut of valves is limited, and frictional losses through the valves are high. In one embodiment, the present valve reduces frictional losses by installing at least two concentric diaphragms in the same valve, where inlet fluid is divided between two or more diaphragms. The fluid is controlled by said diaphragms, and these diaphragms may be controlled by a single pilot valve. By using two diaphragms, the capacity of the valve is increased and frictional losses are reduced by reducing the over-all velocity of the fluid through the valve. The valve may be designed such that each of the concentric diaphragms in the valve will require different initial opening pressures. Thus, when one diaphragm is open, the other diaphragm will remain in closed position until its opening pressure is reached. Thus, the scope of the valve is enhanced, since the valve can be made to operate to handle different scenarios.

Like butterfly and ball valves, the two or more diaphragms in the same valve handle much higher fluid volume than conventional sleeve valves. Also, the double diaphragm design cuts the length and stroke of each diaphragm. This reduction in diaphragm length cuts the overall length and weight of the valve, compared to conventional sleeves valves of equal fluid capacity.

SUMMARY OF THE INVENTION

According to the invention, a multi-diaphragm valve includes a valve body which accommodates a bell type or bell shaped open ended elastomeric diaphragm. The Bell type diaphragm includes a central radially outwardly extending hump, and legs extending axially from opposite sides of the hump. In effect, this is a composite of two diaphragms joined by the hump. Each leg is a cylindrical portion of the diaphragm and in effect, acts as a separate diaphragm in the valve, thus providing a multi-diaphragm valve. The first leg is seated around the outside of an interior wall forming a cylindrical inlet chamber and the second leg is seated around the outside of an interior wall forming a cylindrical outlet chamber, both inside the valve body. Both chambers have dead end partition plates creating closed ends for the interior chambers which meet face to face at the center of the valve body. Said diaphragm legs around said seats preferably will be inclined toward the center of the valve. The legs of the diaphragm are provided snug fit by the outward pressure exerted by the hump of the diaphragm. From here on, the word diaphragm will be understood as an open ended multi-diaphragm of a bell shape, having two cylindrical or two inclined legs, inclining toward the center of the valve body, where legs are mounted around two corresponding seats separated by dead end partition plates in said inlet and outlet chambers. The valve of the invention provides a valve body to accommodate one or more diaphragms, concentric to the longitudinal axis of the valve. Preferably, the ends of the diaphragm or diaphragms are kept free, to relieve excessive stretch from the ends. The bell type diaphragm is divided into two sections; the first section has the first leg, and the second section has the second leg. The two said legs are separated by the circular hump of the diaphragm, where said hump is positioned centrally around said dead end partition plates, and creates a hollow circular cavity around said plates. The valve can be opened or closed much faster than conventional sleeve type valves. The first section or leg of the bell type diaphragm is provided with a plurality of openings in the upstream wall of the hump, to make the first section of the diaphragm function as a check valve. The first section of the diaphragm is installed up stream in the valve. The first section of the diaphragm also provides means for the pilot valve to access fluid from the inlet of the valve. The valve can function as a flow control valve, a pressure reducing valve, a check valve, a pressure relief valve, and an air vacuum valve.

The legs of the diaphragm can be provided with arcuate platens. Whether or not said platens are provided in or around the legs of the diaphragm or diaphragms, depends on the required function which the valve will be required to fulfill. The thickness of the elastomeric diaphragm need not be uniform, it can vary from section to section in legs or in the hump to perform the intended function of the valve. The variable thickness of the diaphragm becomes useful in the design of the air vacuum valve where atmospheric pressure should be able to open the valve to beak the vacuum.

The valve of the invention includes a composite body divided into two parts; the first part and the second part. The first part is upstream, and has an interior cylindrical chamber that functions as an inlet chamber with a cylindrical inlet opening to receive fluid from the inlet pipe of the pipe line in which the valve is installed. It also has a blocking means partition plate P1 to close the end of the chamber and divert the fluid through a plurality of radial slots upstream from the plate extending through the interior wall forming the interior inlet chamber. The second part has an interior cylindrical chamber, similar to the first part, that functions as an outlet chamber; the difference being that the chamber of the second part is approximately a mirror image of the chamber in the first part. The outlet chamber receives fluid from the first part which flows through a plurality of radial slots extending through the interior wall forming the interior outlet chamber. The outlet chamber has a cylindrical outlet opening to provide fluid from the outlet chamber to the outlet pipe of the pipe line in which the valve is installed. The partition plate P2 of the second part closes the end of the outlet chamber and abuts said partition plate P1 when the parts are joined, where P2 blocks reverse flow of fluid from downstream of the valve. Farther away from the partition plates P1 and P2, and also farther away from the radial slots in the two interior walls forming said interior cylindrical chambers, two integrally constructed conic walls W and W1 (preferably having equal inclines), emerge from the walls of said interior cylindrical chambers to form outer chambers and meet in the central transverse vertical plane to the longitudinal axis of the valve body. The walls W and W1 are provided with radial flanges f1 and f2 at their extremities. Once the diaphragm or diaphragms are attached to flange f1, and loaded on the seat of the first part of the valve, the two flanges are joined by means of bolts or by means of an integral coupling provided on one of the two flanges. Thus, the diaphragm for the valve is enclosed in a trapezoidal circular diaphragm chamber formed by joining the outer chambers of the two parts. To attach the two ends of the valve to inlet and outlet pipes, the caming jaws of couplings invented by the inventor under Ser. Nos. 5,387,017 and 5,868,441 may be used. The diaphragm or diaphragms can be pre-loaded or can be loaded into the valve body at site.

The fluid diverted by P1 in the first part, passes through said radial slots of the interior wall of the first part, and is controlled by the first section or leg of the diaphragm. The fluid then passes through the diaphragm chamber around P1 and P2 and through the radial slots of the interior wall of the second part into the interior cylindrical outlet chamber. Flow of fluid through the redial slots of the second part is controlled by the second section or leg of the diaphragm. The fluid flows from the outlet chamber into the outlet pipe.

The pressure reducing or pressure relief valves of this invention are controlled by conventional pilot valves. When the valve is used as a shut off valve, a pilot valve and needle valve are not required. When the valve is used only as a check valve, no control valves are needed. Only three ports V1, V3, and V6 will be connected by tubes common to all three said ports.

In order to increase the flow of fluid through the valve without increasing the friction substantially, two parallel flow paths and control diaphragms may be provided. In such instance, a second interior cylindrical chamber forming a second inlet chamber is provided in the first part in flow communication with the inlet chamber described, which can be referred to as the first inlet chamber and a second interior cylindrical chamber forming a second outlet chamber is provided in the second part in flow communication with the outlet chamber described, which can be referred to as the first outlet chamber. A second diaphragm chamber is also formed with a second diaphragm to provide a controlled flow path between the second inlet chamber and the second outlet chamber similar to the first diaphragm chamber and diaphragm already described. The second chambers will generally be concentric with the first chambers.

Seals and gaskets are provided against unwanted leakage inside the valve, and from the valve to the outside environment.

It should be pointed out that various means other than described above can be adopted to join flanges f1 and f2 or connecting means other than flanges can be used to connect the valve parts; as can various connecting means be used other than flanges 20 and 20A to connect the valve to the inlet and outlet pipes.

In a preferred embodiment of the valve, the valve is connected to the inlet and outlet pipes in a manner which allows the valve parts, when separated, to slide along the pipe a distance sufficient to allow the diaphragm to be removed from the diaphragm chamber and replaced without removing the valve parts from the pipe, or for other maintenance of the valve. When the valve parts slide along the pipe, the ends of the pipes slide into the interior cylindrical chambers. The travel of the parts along the pipe is limited by the distance the pipe ends can slide into the interior chambers.

THE DRAWINGS

In the accompanying drawings, which illustrate the best mode presently contemplated for carrying out the invention:

DETAILED DESCRIPTION OF THE ILLUSTRATED EMBODIMENT

Figure 1:
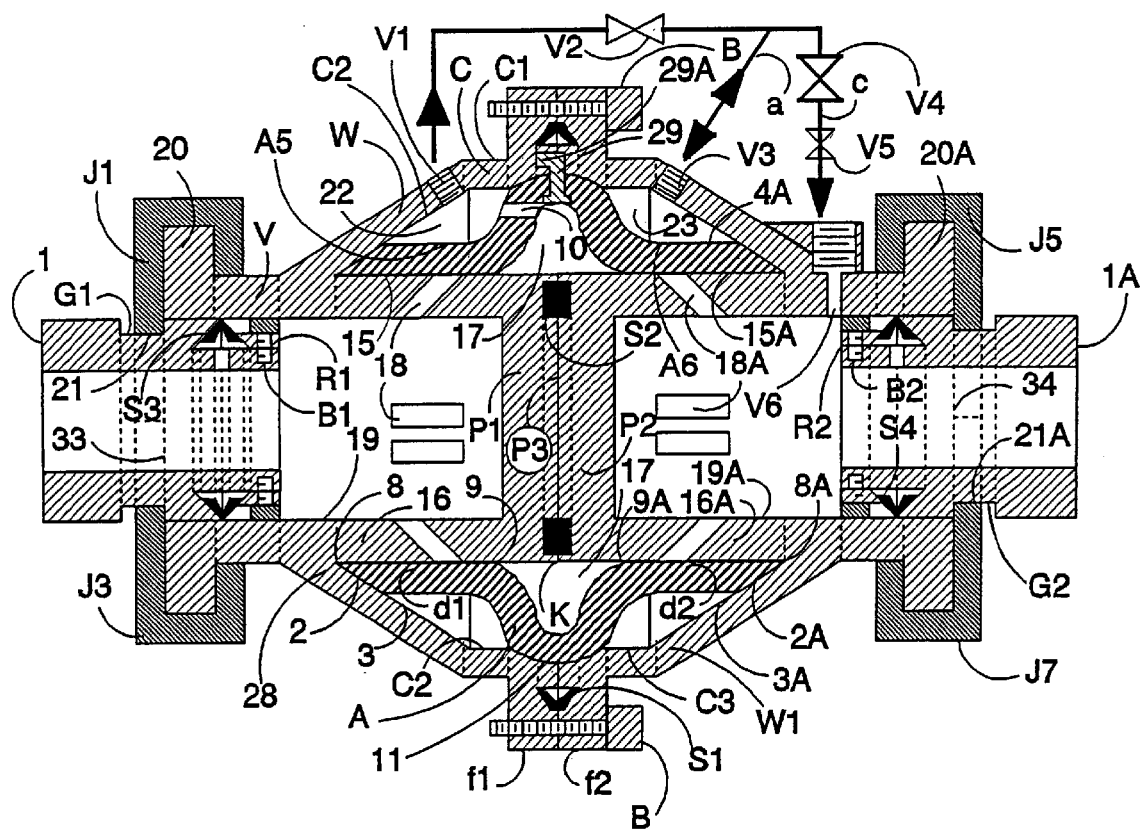
FIG. 1 is an axial vertical section through the center of the basic valve, with a bell curve type diaphragm secured inside the valve body.
Figure 2:
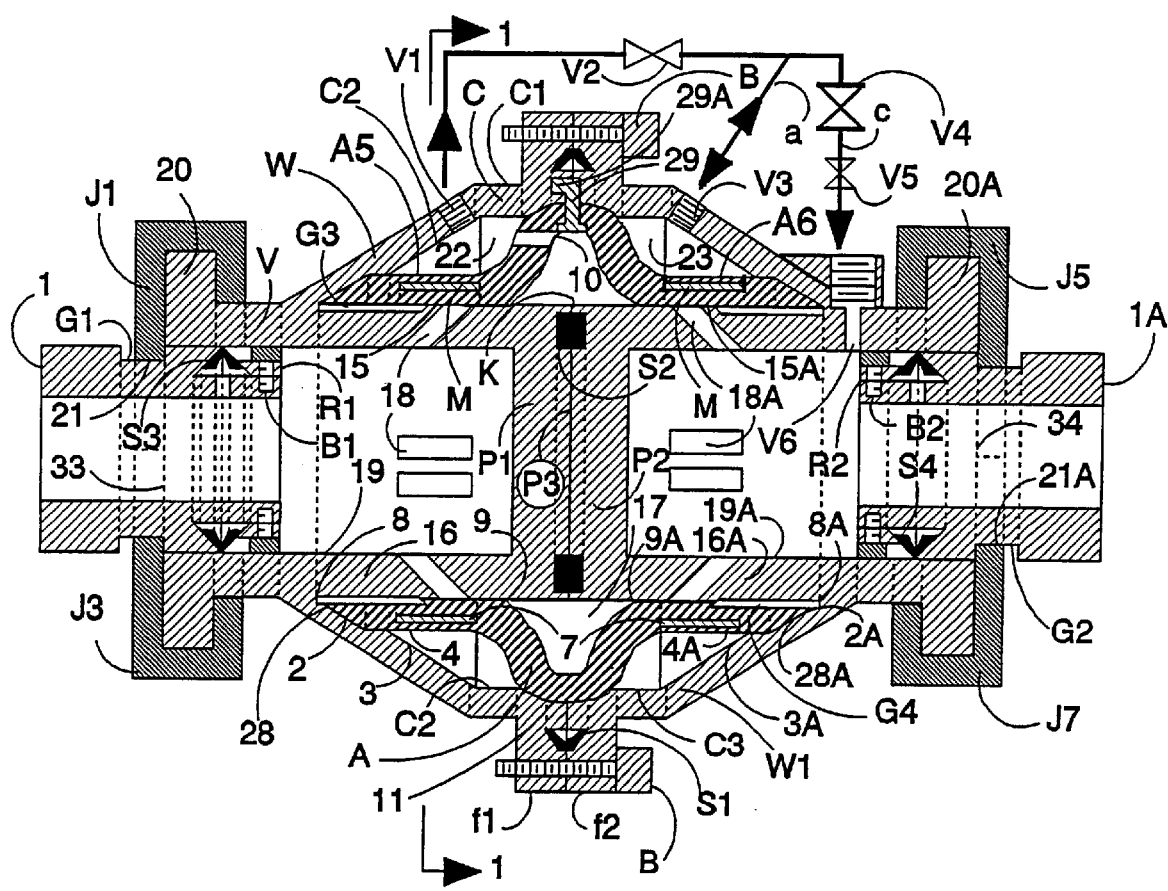
FIG. 2 is an axial vertical section through the center of the valve, where the bell diaphragm is provided with a plurality of arcuate platens.
Figure 3:
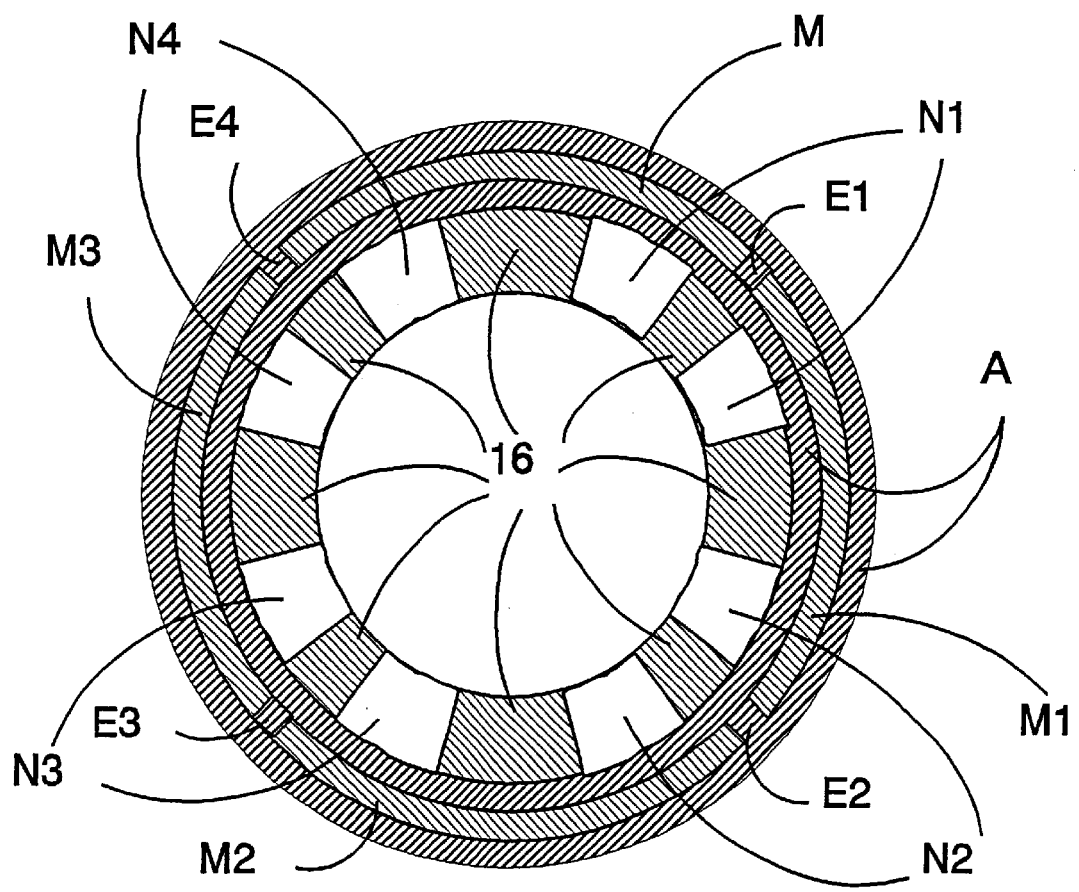
FIG. 3 is a transverse vertical section taken on line 1—1 in FIG. 2 without showing wall W.

The drawings described are not to any particular scale. The valve body is constructed symmetric and concentric to the axis of the valve. Therefore, except in FIG. 3, only axial vertical sections of the valve are shown. To understand the invention, all figures can be studied together. First, FIGS. 1, 2, and 3 will be studied together. FIGS. 1 and 2 are exactly the same, except that the elastomeric diaphragm in FIG. 2 is provided with arcuate platens M, M1, M2, and M3, which are depicted in FIG. 3. If platens are used, there will always be at least one platen, but the total number of platens used can vary from valve to valve, and they can be more than four arcuate platens as depicted by the FIGS. The valve body V includes a composite body made of two parts, where each part is depicted by its outer wall W and W1 respectively. The first part has an inlet cylindrical chamber 16 with inner diameter 19. The inlet chamber 16 has cylindrical inlet 33 for the entrance of the fluid from pipe line 1, and it has a blocking partition plate P1 to divert the fluid through the plurality of radial slots 18 upstream from said partition plate P1. The second part is similar in construction to the first part, having cylindrical chamber 16A with inner diameter 19A; the difference being that 16A is a mirror image of chamber 16, and is used for the exit of said fluid received in the first part. The fluid exits through outlet opening 34. The partition plate P2, of said second part, abuts said partition plate P1, where P2 blocks the reverse flow of fluid from downstream of the valve. Farther away from the partition plates P1 and P2 and from radial slots 18 and 18A in cylindrical chambers 16 and 16A, two integrally constructed radial walls W and W1 having equal inclines emerge from said cylindrical chambers 16 and 16A. The walls W and W1 with flanges f1 and f2 in their extremities diverge outward to meet in a central common plane, which plane is common with the plane passing through P3. Meeting of f1 and f2 preferably create a cylindrical trapezoidal enclosure to hold a bell diaphragm A in FIG. 1, or to hold a bell diaphragm A provided with arcuate platens in FIG. 2. Flanges f1 and f2 are held together by means of bolts shown by B. It is equally possible to join flanges f1 and f2 by means of any suitable coupling made integral with one of said flanges as well.

First, up stream end 2 of leg d1 of diaphragm A is mounted around seat 15 of first part of the valve (and diaphragm is attached to flange f1 to position the platens over slots 18 by means of threadless bolts shown in FIG. 2). Then, end 2A of leg d2 is mounted around seat 15A by moving f2 of second part of the valve toward f1 till both flanges f1 and f2 meet face to face and are joined together by means of bolts. Preferably, seats 15 and 15A along with the corresponding matching legs of the diaphragm incline toward the peripheral circle K of plane P3, which eases the mounting of the diaphragm. When the f1 and f2 are joined together face to face, the legs d1 and d2 make tight snug fit with their corresponding seats 15 and 15A. The valve is connected to the inlet and outlet pipe by means of caming jaws of my inventions U.S. Pat. Nos. 5,387,017 and 5,868,441.

Now, the operation of the valve will be explained. The diverted fluid by partition P1 in the first part passes through said radial slots 18 of the first part 16; and then, it passes over partition plates P1 and P2 through cavity 17; thence, under control of the second portion of diaphragm A it exits through slots 18A to chamber 16A as shown in FIG. 1 and FIG. 2. The inside diameters of chambers 16 and 16A are shown by 19 and 19A. Once the fluid is inside 16A, then it exits the valve through pipe outlet 34 into pipe line 1A. The inner surfaces of walls W and W1 are shown by 3 and 3A respectively. The outer section of the trapezoidal enclosure concentric to the axis of the valve is shown by C, and its inner and outer surfaces are depicted by C2 and C1 respectively.

The valve V in FIGS. 1 and 2 is attached to pipes 1 and 1A by means of integral couplings of the valve, which have means consisting of flanges 20 and 20A and sets of camming jaw members J1, J3; and J5 and J7 mounted around said flanges. As mentioned above, inventor holds patents to such couplings under U.S. Pat. Nos. 5,387,017 and 5,568,441. The bottoms 21 and 21A of said jaw members are locked into grooves G1 and G2 of pipe 1 and 1A. The valve can also be attached to pipe ends by groove coupling by providing grooves instead of flanges 20 and 20A.

The inverted V type seals S3 and S4 are employed to seal any leakage. The seals are held in place by means of rings R1 and R2, which are held in place by means of bolts B1 and B2. Bolts B1 and B2 can be screwed into R1 and R2 from outside the valve body through chamber wall 16. It is understood that any other suitable seals may be used to block the exit of fluid through the valve body.

The diaphragms can be changed without removing the valve body from inlet and outlet pipes 1 and 1A. By unlocking said coupling jaws, the two parts W and W1 of valve V is pushed apart to an extent that it would allow the replacing of the diaphragm A. First, end 2 of d1 the inlet section of diaphragm A (with plurality of openings 10) is loaded around seat 15 provided by cylindrical chamber 16, and diaphragm is fixed to flange f1 by means of threadless bolts 29. Bolts 29 are provided with prongs 29A to fix diaphragms to the face of flange f1. By fixing 29A into corresponding holes provided in the face of f1, diaphragm A is attached to f1. After fixing the first section of the diaphragm, the other end 2A of d2 is pushed around seat 15A provided by cylindrical chamber 16A of the second part of the valve V. Then, flange f2 of the second part of the valve is moved toward f1 until the two flanges are held together by means of bolts B, and two partitions plates P1 and P2 of chambers 16 and 16A are brought into face to face contact, as shown by P3. It is brought to notice here, that in FIGS. 1 and 2, partition plate P2 can be provided with a circular opening to cut the material cost and the weight of the valve, and it will not impede the function of the valve. Thus, the sections of bell type diaphragms shown between 8 and 9 and 8A and 9A are seated around 15 and 15A, and the hump of the bell is positioned against surface 11 provided by flanges f1 and f2. Seals S1 and S2 block the passage of fluid. Different types of bolts and nuts can be used to tie f1 to f2. For the best mode of the invention seat 15 and 15A are inclined inward towards the common peripheral circle K between P1 and P2 which provides snug fit and eases the mounting of cylindrical leg portions d1 and d2 of diaphragm A.

The elastomeric diaphragm shown in FIG. 2, and also depicted in FIG. 3, is provided with arcuate platens shown by M, M1, M2 and M3 on both sides of the diaphragm. The arcuate platens are made from ridged or springy metallic or plastic materials or reinforced rubber. Said platens are mounted inside or around the cylindrical portions d1 and d2 of diaphragm A. Partitioning arms between platens shown by E1, E2, E3, and E4, may or may not be integral parts of the diaphragm. To the maximum extent, platens are kept freely slidable with respect to the elastomeric diaphragm. The platens can be sandwiched between two layers of elastomeric material, or their nearest end to P1 and P2 can be glued to the elastomeric material of the diaphragm. Each arcuate platen will extends over at least one slot, or it may extend over more than one slot simultaneously. In case of valves of small sizes, may only one platen in each leg d1 and d2 would be enough to control the desired flow through the valve.

Now, the invented valve, operated with a bell curve type diaphragm, will be explained. The operation of the valve is the same in all figures. The valve is operated by conventional controls, and pilot valves. The first section of the diaphragm is provided with a plurality of openings 10, and it is always pstream from P1 and P2. The fluid enters the valve through inlet opening 33. To open the valve, fluid passes through a plurality of slots 18, and it expands the diaphragm around 15 and also expands the cavity 17 concentric to the axis of the valve. Thence, through openings 10, fluid enters cavity 22 created by surfaces 3, C2, and the outer surface A5 of the first section of the bell diaphragm A. While the second section of the bell curve diaphragm A, downstream from 17, remains closed, the fluid through opening V1 reaches needle valve V2, which controls fluid to two way line "a". Two way line "a" is connected to cavity 23 through opening V3, to modulate pilot control valve V4. Cavity 23 is created in a manner similar to cavity 22, by inner surfaces C3, 3A of second part of valve, and outer surface A6 of the second section of the diaphragm A. The pilot valve V4 is connected to opening V6 through shut off valve V5. By shutting off shut-off valve V5, cavity 23 is filled with fluid through needle valve V2. By opening shut-off valve V5, the second section of the diaphragm, over a plurality of radial slots 18A, opens, and fluid passes through 18A to outlet chamber 16A, and pilot valve V4 actuates to control the volume of flow and pressure down stream in the pipe line. The valve can be closed by shutting off valve V5. If there is reverse flow, then cavity 22 gets filled rapidly by means of openings 10 before the fluid surge can strike back at the valve, the first section of diaphragm A shuts off slots 18 in chamber 16. Thus bell type diaphragm A provides not only a pressure or volume controlled valve, but it also provides a check valve as well. Openings 10 are preferably located in the diaphragm furthest away from P1 and P2. The location and close proximity of opening 10 to V1 allows the use of relatively short supply lines to connect pilot valve V4 to V1.

Figure 4:
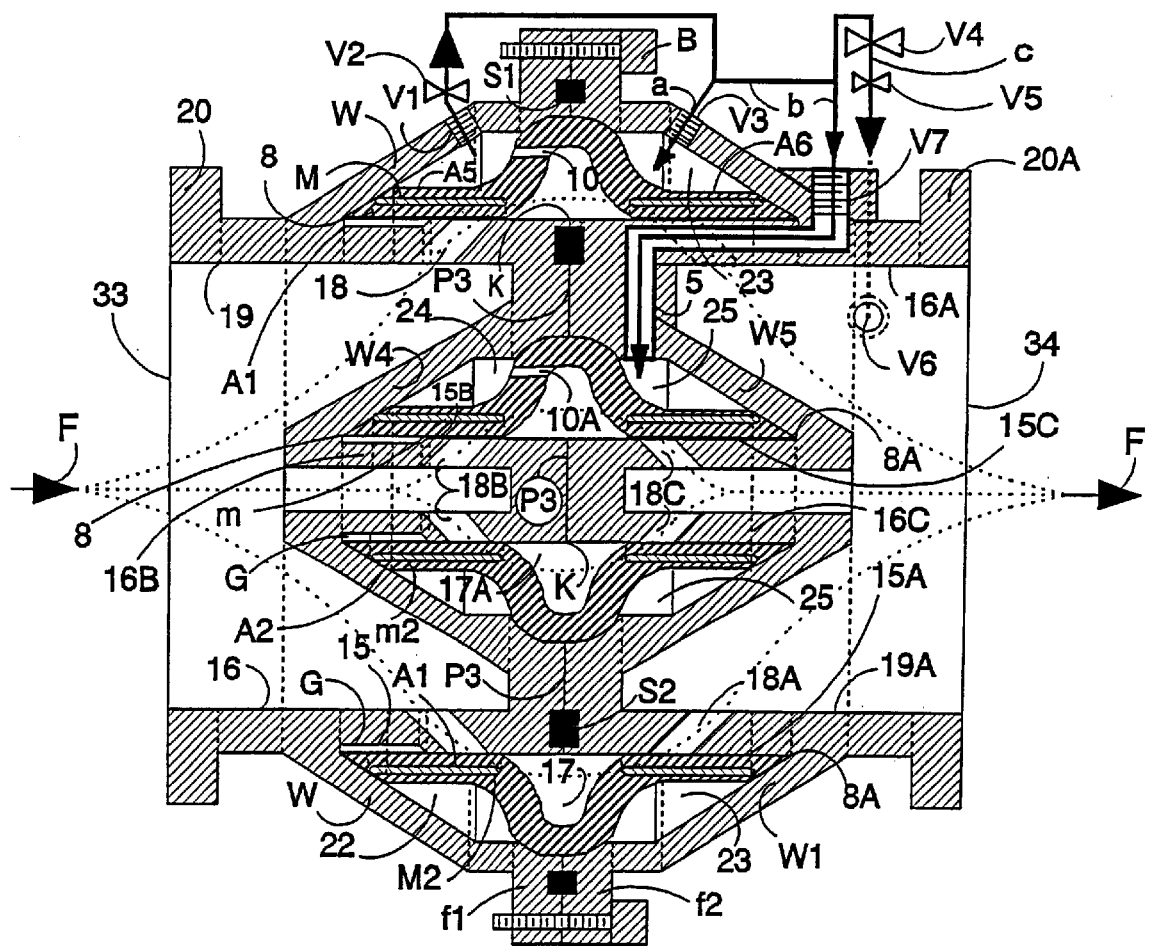
FIG. 4 is an axial vertical section through the center of the valve with two bell curve type diaphragms with arcuate platens, where each diaphragm is installed inside of an enclosure concentric to the axis of the valve.
Figure 5:
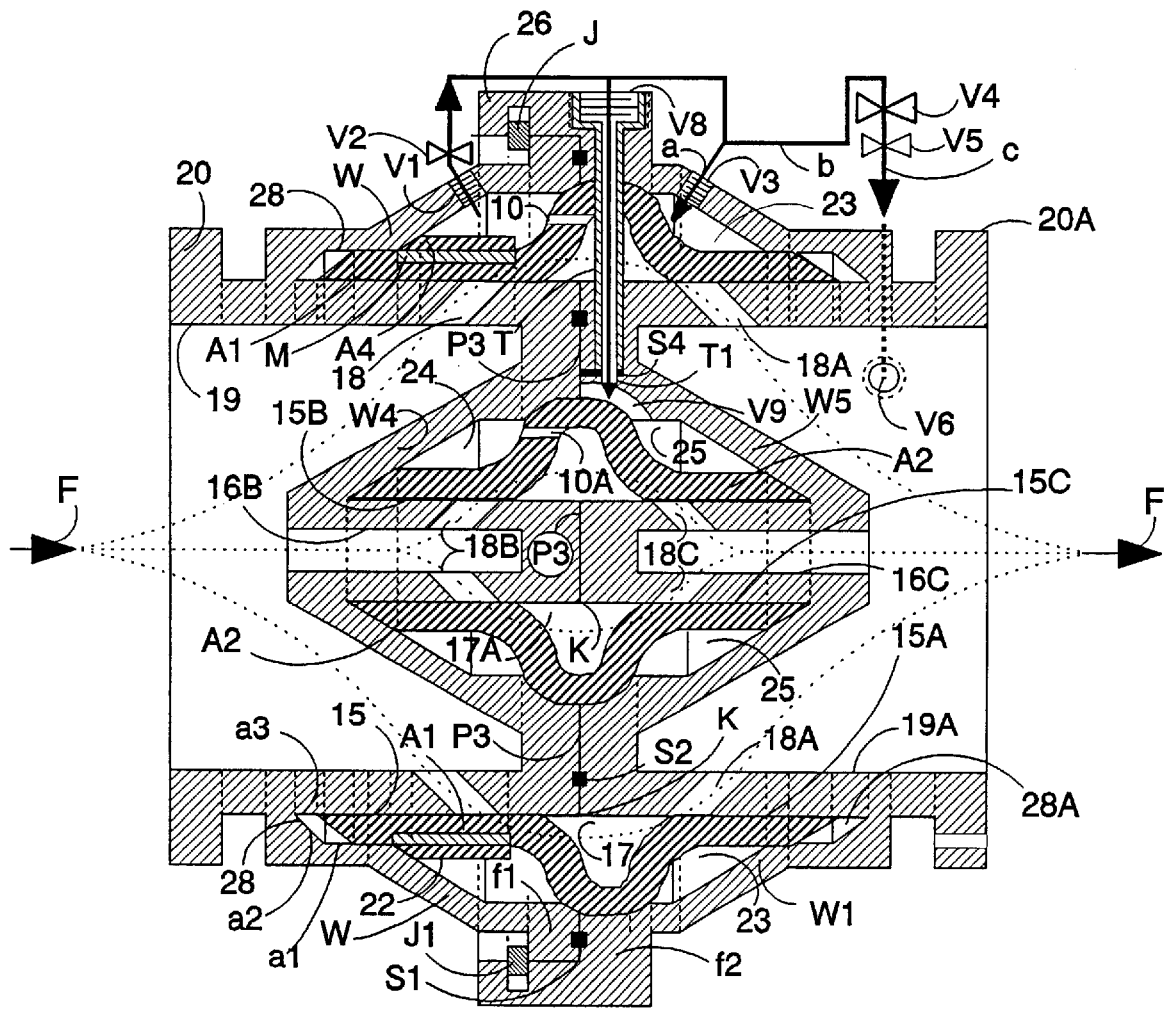
FIG. 5 is similar to FIG. 4, except that, unlike the flange connection as in FIG. 4, the two parts of the valve are held together by means of a coupling, which is constructed as an integral part of the second part of the valve.

Now, FIGS. 4 and 5 will be explained together. The only difference between FIGS. 4 and 5 compared to FIGS. 1 and 2 is that FIGS. 4 and 5 pertain to the use of at least two diaphragms, A1 and A2 (to create two inner and outer valves concentric to the axis of the over all valve) in the same valve body. The functions of the valve do not change. This enlarges the fluid volume capacity of the valve if it is used as pressure reducing valve or a check valve. It also enhances the fluid volume capacity when valve is used as a shut of valve.

Both diaphragms A1 and A2 in FIGS. 4 and 5 are controlled by the same type of needle valve V2, pilot valve V4, and shut off valve V5, as in FIGS. 1 and 2. Inlet and outlet openings V1 and V3 provide the same functions as they provide in FIGS. 1 and 2. One pilot valve V4 instead of controlling one diaphragm as in FIGS. 1 and 2, controls two or more diaphragms in FIGS. 4 and 5.

The valve in FIG. 4 functions the same as in FIG. 2. As in FIGS. 1 and 2, the fluid to the common inlet chamber 16 for both the inner and outer valves (i.e. for both diaphragms), enters through common inlet 33. The divided fluid flow takes the path shown by dotted lines between F and F. One of these paths passes through radial slots 18 and 18A provided in 16 and 16A, while the second path passes through radial slots 18B and 18C provided in 16B and 16C. The fluid then exits out of the common outlet 34. The inner enclosure defined by wall W4 and W5 accommodates diaphragm A2. The cylindrical inlet chamber and cylindrical outlet chamber for the inner valve are shown by 16B and 16C, and their outer surfaces, which provide seats for the diaphragm A2, are depicted by 15B and 15C. Cavities 23 and 25 are supplied with fluid from chamber inlet 16, through slots 18, openings 10, opening V1 in Wall W, needle valve V2, and openings V3 and V7 respectively. The path of fluid from V7 through channel 5 is shown by a line with heavy arrows, which ends in cavity 25. Line "a" is connected to line "b" and Pilot valve V4. Pilot valve V4 is connected to opening V6, through shut off valve V5. Shutting of shut off valve V5 fills cavities 23 and 25 with fluid. By opening shut off valve V5, pilot valve V4 is actuated to control the flow and pressure of fluid to common outlet chamber 16A, and thence down stream in the pipe line. Diaphragms A1 and A2 are also provided similar platens, as depicted in FIG. 2 and 3. In the case of reverse fluid flow, fluid fills the cavities 22 and 24 by means of openings 10 and 10A to shut off the slots 18 and 18B by means of upstream cylindrical portions of diaphragms A1 and A2. The bell type circular cavity 17A in the inner valve is the counter part of cavity 17 in the outer valve. Optional grooves of minute depth shown by G, for both the inner and outer valve, in inlet chambers 16 and 16B, may be provided; Grooves similar to groove G may be provided on seat 15A in the second part of the valve as well. Such a groove ease the mounting of diaphragm, but diaphragm performs the same as before. It is pointed out here that from points 8 and 8A to common peripheral circle K, seats 15 and 15A, and seats 15B and 15C, for diaphragms A1 and A2, may be inclined inward toward K to ease the mounting of the diaphragm. It is also pointed out that bolts 29 with prongs 29A, as shown in FIG. 2, also will be used with the diaphragms A1 and A2 in FIGS. 4 and 5 to position arcuate platens (shown by M,, M2, and m and m2 for diaphragms A1 and A2 respectively) properly over slots 18 and 18A; and over slots 18B and 18C.

FIG. 5 is the same as FIG. 4, except that instead of providing both flanges f1 and f2, flange f2 is modified to have an integral coupling 26 lever jaws J and J1. This type of coupling under Patent Pending Ser. No. 60,380,054 with the U.S. Patent and Trademark Office is applied for by the inventor of this invention. It is pointed out here again that any other types of couplings also can be used to join f1 and f2. In FIG. 5, instead of using channel 5 as in FIG. 4, the fluid is supplied to cavity 25 of the inner valve with diaphragm A2 through a tube T, which has a threaded inlet socket V8, and has its end against seal S4. Said seal S4 is connected to bore opening T1 which itself is connected to crescent shaped cut opening V9, where V9 is connected to cavity 25. Tube T passes through bell diaphragm A1. The pressure in cavity 17 pushes A1 outward against the flange f2, and the section of A1 encircling tube T acts as an "O" ring seal. It is also Practical to use separate "O" ring between A1 and f2. Thus, it is clear that various fluid paths can be adopted to supply inlet fluid to the inner diaphragms to control the supply of fluid for the inner valves. Any other types of seals other than seals S1, S2 and S4 may be used to block the passage of fluid. The valve body in FIG.5 shows cavities 28 and 28A delineated by sides a1, a2 and a3. The valves in all FIGS. can be provided such cavities for the extension of ends 2 and 2A (shown in FIGS. 1 and 2) of cylindrical legs d1 and d2 of the diaphragms. In one scenario, the ends 2 and 2A need not to touch the walls of the valve as shown by empty portion of cavity 28 in FIG. 5, and platens shown by M between layers A4 and A1 will remain out side cavity 28. It is pointed out here that flanges 20 and 20A in all FIGS. also can be attached to conventional flanges on pipe ends by means of bolts.

Figure 6:
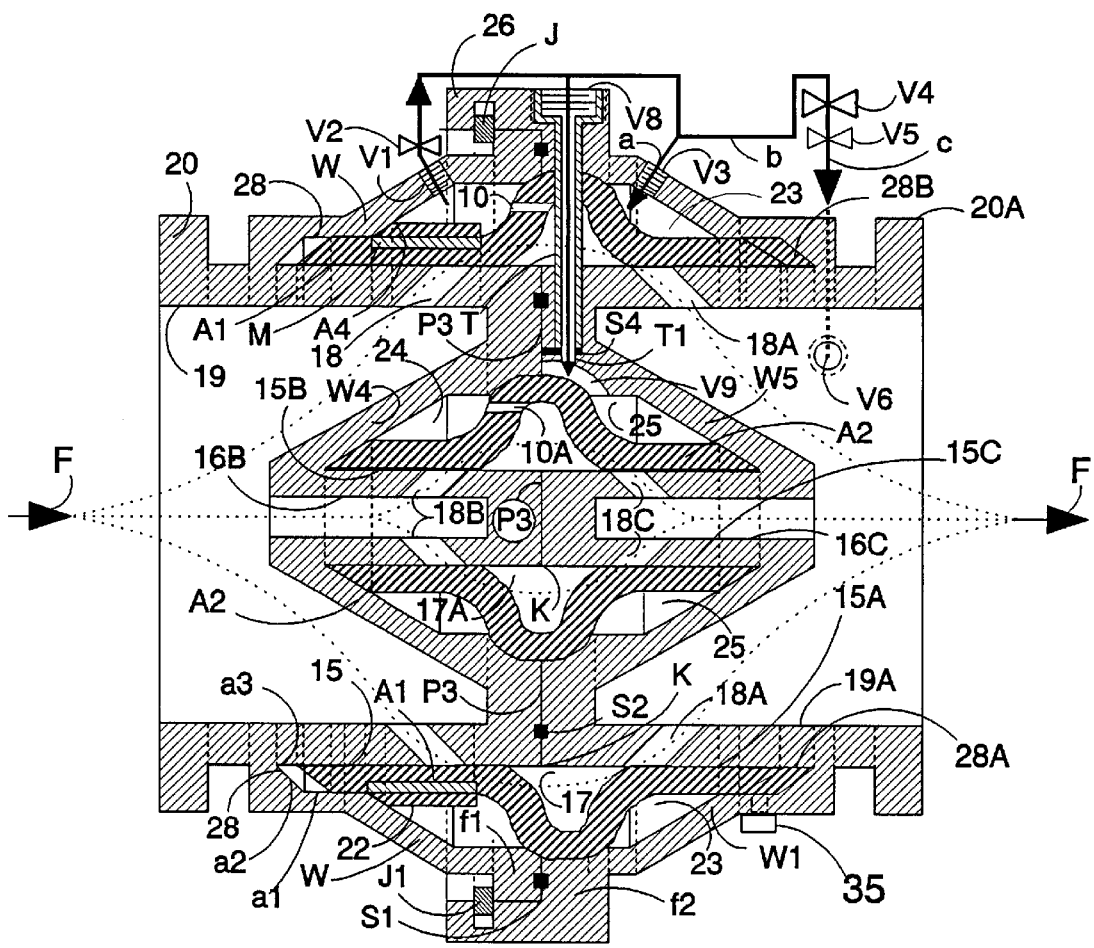
FIG. 6 is similar to FIG. 5, except that one leg of the outer diaphragm is tied or connected to the valve.

In a second scenario, as shown in FIG. 6, the entire cavity 28A is filled by the extension 28B of the cylindrical leg, and is tied to the valve body by the plurality of bolts 35.

It is pointed out here again that, when the valve of this invention is used as a check valve only then no control valves are needed, only three ports V1, V3 and V6 will be connected by tubes common to all three said ports. The valve will permit the fluid flow from upstream, but the reverse flow it will stop.

While the valves have been described with slots extending through the interior walls between the interior cylindrical chambers and the outer chambers, the indication of slots is meant to include any openings which allow flow of fluid between the two chambers. Further, while the bell type or shaped diaphragm has been described as a single piece, it could be made up of more than one piece. For example, the bell shaped diaphragm could be made up of two diaphragm pieces joined at the apex of the hump by being secured together along the junction of the two valve parts, such as by being held together by being sandwiched in a recess between the two parts.

It is to be understood that opening 10 and 10A can be eliminated from the multi-diaphragm and the multi-diaphragm can be made to function as a single diaphragm as well by supplying controlling fluid either from the pipe line or from a source other than the pipe line.

Whereas this invention is here illustrated and described with reference to the embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A multi-diaphragm flow control valve comprising:
    a valve body separable into a first part and a second part abutted in an axial direction when the two parts are joined, each part including:
        an interior cylindrical chamber with a closed end which separates the interior cylindrical chamber in the first part from the interior cylindrical chamber in the second part, and an open end for connection to a pipe, the open end of one part forming a valve inlet when the parts are joined and the open end of the other part forming a valve outlet when the parts are joined,
        an outer chamber surrounding a portion of the interior cylindrical chamber and separated therefrom by an interior wall, said outer chamber extending over the closed end of the interior cylindrical chamber of the part so as to join with the outer chamber of the other part to form a diaphragm chamber extending between the two parts when the parts are joined,
        slots through the interior walls connecting the cylindrical interior chamber and the outer chamber of each part, and
        a connector co-operable with the connector on the other part for joining the parts together;
    a cylindrical bell type elastomeric diaphragm having a central radially outwardly extending hump and with legs extending axially from opposite sides of the hump positioned in the diaphragm chamber with the hump positioned substantially over the joint where the two parts are abutted and the respective legs extending over the slots through the interior walls of respective parts;
    means to pressurize and depressurize the diaphragm to allow or block flow through the diaphragm chamber from the interior cylindrical chamber in one part to the interior cylindrical chamber of the other part; and
    means for coupling the valve inlet and valve outlet to inlet an outlet pipes.

2. A multi-diaphragm flow control valve according to claim 1, wherein flow through the valve is blocked when the diaphragm is pressurized against the slots in at least one valve part.

3. A multi-diaphragm flow control valve according to claim 2, wherein the means to pressurize and depressurize the diaphragm controls flow through the valve.

4. A multi-diaphragm flow control valve according to claim 3, wherein the diaphragm forms three chambers in the diaphragm chamber, a flow chamber and two pressure control chambers.

5. A multi-diaphragm flow control valve according to claim 4, wherein a side of the diaphragm chamber is formed by the interior walls and an opposite side is formed by a wall opposite the interior walls, and wherein the hump of the diaphragm touches the opposite wall to divide the diaphragm chamber into two pressure control chambers between the diaphragm and portions of the opposite wall.

6. A multi-diaphragm flow control valve according to claim 5, wherein the diaphragm is secured in the diaphragm chamber.

7. A multi-diaphragm flow control valve according to claim 6, wherein the hump of the diaphragm is secured to the diaphragm chamber.

8. A multi-diaphragm flow control valve according to claim 6, wherein an end of one diaphragm leg is secured to the diaphragm chamber.

9. A multi-diaphragm flow control valve according to claim 1, wherein the connector is a flange extending from each part which are secured together to join the parts.

10. A multi-diaphragm flow control valve according to claim 9, wherein the flanges are joined by bolts.

11. A multi-diaphragm flow control valve according to claim 1, wherein the means for coupling the valve inlet and valve outlet to inlet an outlet pipes are radial flanges mounted with caming jaw means.

12. A multi-diaphragm flow control valve according to claim 1, wherein the means for coupling the valve inlet and valve outlet to inlet and outlet pipes allow the respective valve parts, when separated, to move along the respective pipe to separate the valve parts.

13. A multi-diaphragm flow control valve according to claim 12, wherein the respective valve, parts may move along the respective pipes a distance sufficient to separate the parts sufficiently to remove and replace the diaphragm.

14. A multi-diaphragm flow control valve according to claim 1, wherein the means for coupling the valve inlet and valve outlet to inlet and outlet pipes allow the respective valve parts, when separated, to move along at least one respective pipe to separate the valve parts.

15. A multi-diaphragm flow control valve according to claim 1, wherein the closed ends of the interior chambers abut when the parts are joined.

16. A multi-diaphragm flow control valve according to claim 1, wherein each part additionally includes:
    a second interior cylindrical chamber with a second internal cylindrical chamber closed end which separates the second interior cylindrical chamber in the first part from the second interior cylindrical chamber in the second part, and an open end in communication with the interior cylindrical chamber of that part,
    a second outer chamber surrounding a portion of the second interior cylindrical chamber and separated therefrom by a second interior wall, said second outer chamber extending over the closed end of the second interior cylindrical chamber of the part so as to join with the outer chamber of the other part to form a second diaphragm chamber extending between the two parts when the parts are joined,
    slots through the second interior walls connecting the second cylindrical interior chamber and the second outer chamber of each part, and a second cylindrical bell type elastomeric diaphragm having a central radially outwardly extending hump and with legs extending axially from opposite sides of the hump positioned in the second diaphragm chamber with the hump positioned over the joint where the two parts are joined together and the respective legs extending over the slots through the second interior walls of respective parts;

means to pressurize and depressurize the second diaphragm to allow or block flow through the second diaphragm chamber from the second interior cylindrical chamber in one part to the second interior cylindrical chamber of the other part to form a second controlled flow path through the valve in parallel with the flow path through the diaphragm chamber to increase the flow capacity of the valve.

17. A multi-diaphragm flow control valve according to claim 16, wherein the second interior cylindrical chamber is concentric with the interior cylindrical chamber.

18. A multi-diaphragm flow control valve according to claim 17, wherein the second interior cylindrical chamber is concentric with and inside the interior cylindrical chamber.

19. A multi-diaphragm flow control valve according to claim 16, wherein the means to pressurize and depressurize the diaphragm is also the means to pressurize and depressurize the second diaphragm.

* * * * *